March 24, 1931.  F. G. FOLBERTH ET AL  1,797,977
WINDSHIELD CLEANER
Filed July 15, 1924
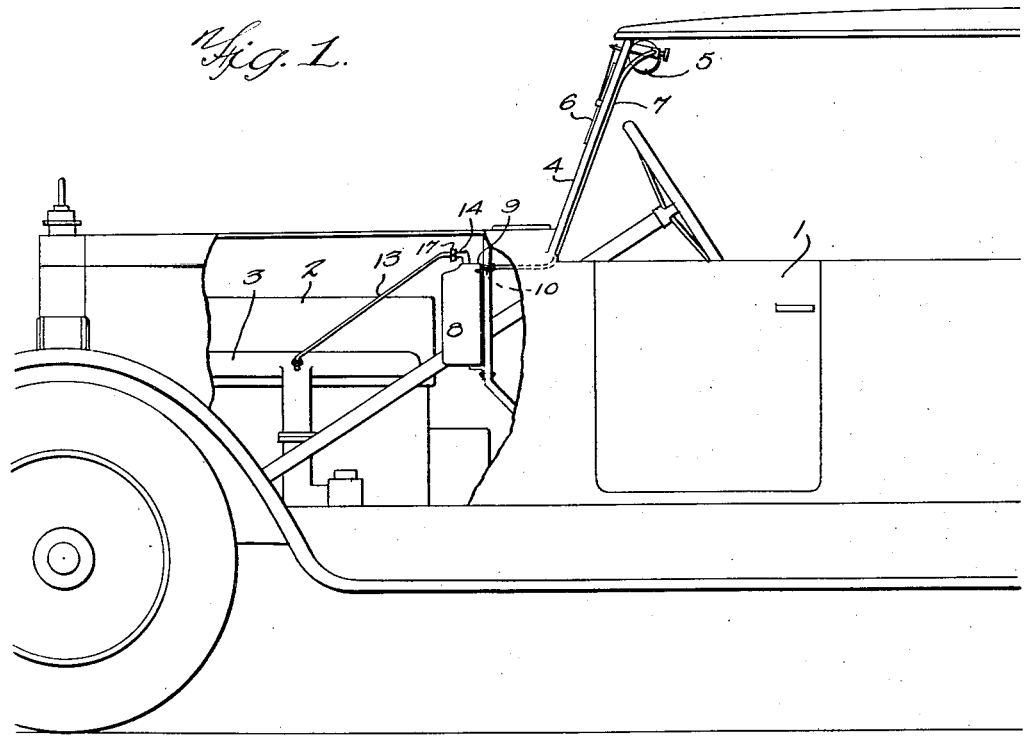
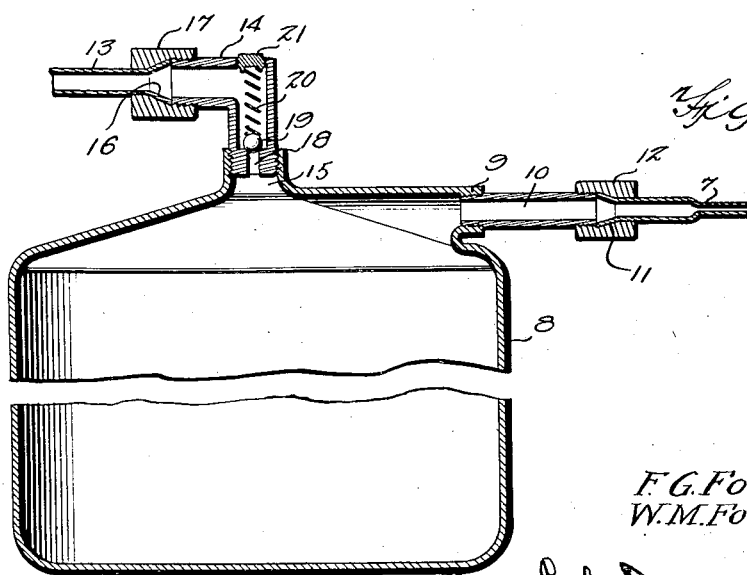
Inventors
F. G. Folberth
W. M. Folberth
By
Attorney Patented Mar. 24, 1931

1,797,977

UNITED STATES PATENT OFFICE

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK, A CORPORATION OF NEW YORK

WINDSHIELD CLEANER

Application filed July 15, 1924. Serial No. 726,223.

This invention relates to windshield cleaners, and more particularly to suction operated windshield cleaners.

In a prior patent to William M. Folberth, granted February 7, 1922, No. 1,405,773, there is described and claimed a windshield cleaner consisting of a suction motor adapted to be arranged adjacent the windshield and connected to the intake manifold of the engine to be operated thereby, the suction motor being adapted to actuate a cleaner element contacting with a portion of the windshield frame to clean it.

In the operation of an internal combustion engine for driving a motor vehicle, the suction in the manifold varies within wide limits depending upon the position of the throttle valve of the carburetor, and when the engine is laboring under a load, the vacuum is decreased to such an extent that the motor of the windshield cleaner has a tendency to decrease its speed.

In the present invention, we provide means for driving a suction motor at a substantially uniform speed regardless of the condition under which the engine is operating, and regardless of variations in the vacuum in the manifold.

More specifically, the invention comprises a storage tank adapted to be arranged in the conduit between the manifold and the cleaner motor and provided with a check valve on its outlet side, the manifold being adapted to create a vacuum in said tank, which vacuum serves to operate the cleaner at a uniform speed even though the vacuum normally present in the manifold of the engine varies or is decreased due to load conditions on the engine.

In the accompanying drawings, we have shown one embodiment of the invention. In this showing:

Figure 1 is a side elevation of a motor vehicle, part of the hood and cowl being broken away to more clearly illustrate the invention, and, Figure 2 is a vertical sectional view of the vacuum tank.

Referring to the drawings, the reference numeral 1 designates generally a motor vehicle of the usual construction, provided with an engine 2, having an intake manifold 3. The vehicle is also provided with a windshield 4, and a cleaner motor 5 is arranged adjacent the top of the windshield, preferably on the interior in the manner shown in the patent to William M. Folberth, Reissue No. 15,502, granted December 5, 1922. The motor is adapted to actuate a cleaner element 6, which contacts with a portion of the windshield to clean it. A conduit 7 is connected to the motor and is adapted to connect it to a source of suction.

Instead of extending the conduit 7 directly to the manifold in the manner heretofore employed, we interpose a tank 8 between the motor and the manifold. As shown, the tank is provided with an inlet opening 9, adapted to receive a tube 10. The conduit 7 is provided with a flared end 11, adapted to be received within a nipple 12 which is in threaded engagement with the outer end of the tube.

The outlet end of the tank is connected to the manifold by a conduit 13. This conduit may be tapped into the manifold in the usual manner and the other end of the conduit is adapted to be connected to a valve casing 14, arranged on the tank and connected to an outlet opening 15, formed therein. As shown, the tube 13 is provided with a flared end 16, adapted to be received in a nipple 17, which has threaded engagement with the outlet end of the valve casing 14. The valve casing is provided with a reduced port 18 at its lower end, forming a valve seat at the upper end of this port. This valve seat is adapted to receive a check valve consisting of a ball 19, held in place by a spring 20. As shown, the valve casing may be provided with an opening in alinement with the reduced bore 18 for the insertion of the valve and the spring and this opening is adapted to be closed by a plug 21.

The operation of the device will be apparent from the foregoing description. When the engine is operating under normal conditions, the manifold draws air from the vacuum tank 8, forming a vacuum therein. The check valve 18 prevents air from flowing into the tank in a reverse direction, and a partial vacuum is maintained in the tank at all times, while the engine is operating. The suction drawing air through the cleaner motor is due to the vacuum in the tank 8 and even if the vacuum in the manifold of the engine should vary due to changed conditions under which the engine and vehicle are operating, the vacuum in the tank remains fairly constant, causing the cleaner motor to be driven at a uniform speed. As the decrease in vacuum in the manifold is generally for a short period of time, the engine will begin to draw air from the tank before the vacuum in the tank is completely exhausted and the cleaner will continue to operate at a fairly constant speed.

It is to be understood that the form of our invention herewith shown and described is to be taken as a preferred example of the same, and that various changes in the shape, size, and arrangement of parts may be resorted to without departing from the spirit of the invention or the scope of the subjoined claims.

We claim:

1. The combination with an internal combustion engine of a motor vehicle, in the intake manifold of which engine the degree of suction is variable during the normal operation of the motor vehicle; and a windshield cleaner comprising a double-acting, suction-operated motor and a wiper element operable thereby, said windshield cleaner motor being arranged to move the wiper element back and forth across the windshield of the motor vehicle; of a suction storage tank interposed in the connection between the intake manifold and the windshield cleaner motor, and a check valve in the connection between the tank and the intake manifold and opening toward the latter whereby when the degree of suction in the intake manifold is in excess to that required for the normal operation of said suction-operated motor such excess will store in said tank, and whereby when the degree of suction obtaining within said intake manifold is insufficient to normally operate said suction-operated motor and is less than the stored suction within the tank said check valve will close communication between the intake manifold and the tank whereby said suction-operated motor will be operated from the supply of suction stored within said tank.

2. In combination with a suction-operated windshield cleaner connected by a suction conduit to the intake manifold of an internal combustion engine of a motor vehicle, wherein the manifold suction available for operating the windshield cleaner is variable between a limit insufficient to practically operate the cleaner and a limit excessive to that required to practically operate the cleaner; of means acting to render the suction influence of the intake manifold on the windshield cleaner substantially uniform, said means comprising an enlarged chamber interposed in the suction conduit between the intake manifold and the windshield cleaner for receiving and retaining excessive suction from the intake manifold for expenditure upon the windshield cleaner when the degree of suction in the intake manifold is insufficient for the practical operation of the windshield cleaner, and a valve interposed between the chamber and the intake manifold and adapted to seat toward said chamber for closing the passage between the latter and said intake manifold when the degree of suction in the latter is less than that maintaining in the chamber whereby the pressure in said chamber is not raised by and when a higher pressure exists in the intake manifold.

3. A windshield wiping apparatus comprising a tank, a pipe line for connecting the tank with the intake manifold of an internal combustion engine, a check valve in said pipe line opening in a direction away from the tank, a differential pressure-operated motor, a wiper member operably connected with said motor, and a pipe line connecting the tank with the motor.

In testimony whereof, we affix our signatures.

FREDERICK G. FOLBERTH.
WILLIAM M. FOLBERTH.